United States Patent

Kohn

[15] 3,679,734
[45] July 25, 1972

[54] M-α-HYDROXYALIPHATICHYDROCARBYLPHENYL N-METHYL CARBAMATES

[72] Inventor: Gustave K. Kohn, Berkeley, Calif.

[73] Assignee: Chevron Research Company, San Francisco, Calif.

[22] Filed: March 24, 1971

[21] Appl. No.: 127,778

[52] U.S. Cl. ................. 260/479 C, 260/345.9, 260/624 B, 260/624 E, 424/300
[51] Int. Cl. ........................................... C07c 125/06
[58] Field of Search ................................ 260/479 C

[56] References Cited

OTHER PUBLICATIONS

Metcalf et al., Jour. of Economic Entomology, Vol. 55 (1962), pp. 889–894.

Primary Examiner—James A. Patten
Attorney—G. F. Magdeburger, John Stoner, Jr., J. A. Buchanon, Jr.; Raymond Owyang.

[57] ABSTRACT m-α-hydroxyaliphatichydrocarbylphenyl N-methyl carbamates of the formula

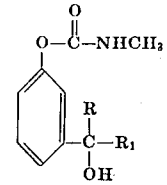

wherein R is methyl or ethyl and $R_1$ is ethyl, propyl, vinyl or allyl find use as insecticides.

4 Claims, No Drawings

3,679,734

M-α-HYDROXYALIPHATICHYDROCARBYLPHENYL N-METHYL CARBAMATES

BACKGROUND OF THE INVENTION

1. Field

The present invention relates to insecticidal carbamates. More particularly, the present invention is concerned with m-β-hydroxyaliphatichydrocarbylphenyl N-methyl carbamates and their use in the control of insects.

Prior Art m-alkylphenyl N-methyl carbamates are well known in the art as agricultural pesticides, particularly for their effectiveness as digestive and/or contact toxicants which inhibit the cholinesterase enzyme system of the parasite. See for example U.S. Pat. Nos. 3,062,707; 3,062,864; 3,062,865; 3,062,866; 3,062,867; 3,062,868; 3,066,163; 3,076,741 and 3,110,726.

DESCRIPTION OF THE INVENTION

Carbamates of the present invention find use in pesticide control and are represented by the formula:

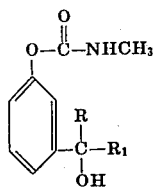

wherein R is methyl or ethyl and $R_1$ is ethyl, propyl (n- or iso), vinyl or allyl. Preferably R is methyl.

Representative compounds of the present invention are m-(2-hydroxy-2-butyl)phenyl N-methyl carbamate, m-(2-hydroxy-2-pentyl)phenyl N-methyl carbamate, m-(3-hydroxy-3-pentyl)phenyl N-methyl carbamate, m-(3-hydroxy-3-hexyl)phenyl N-methyl carbamate, m-(2-hydroxy-2-butenyl-3)phenyl N-methyl carbamate, m-(2-hydroxy-2-pentenyl-4)phenyl N-methyl carbamate, m-(3-hydroxy-3-pentenyl-1)phenyl N-methyl carbamate and m-(3-hydroxy-3-hexenyl-5)phenyl N-methyl carbamate.

Compounds of the present invention are prepared by reacting an appropriate phenol with methyl isocyanate according to the following equation:

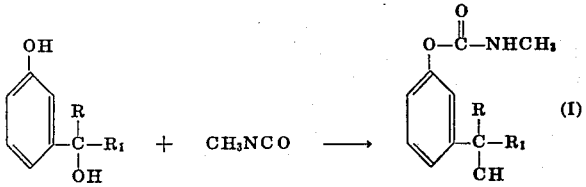

Generally, equimolar amounts of the phenol and the isocyanate will be used. The amount of the isocyanate should not exceed 1.1 mole per mole of phenol. Generally, a small amount of triethylamine or other suitable organic base is added. The reaction is generally run in the presence of a solvent such as dimethoxyethane or methylene chloride. The amount of solvent will range from 2 moles to 20 moles per mole of phenol. The reaction temperature will range from 20° C. to 85° C. and the reaction time from ½ to 72 hours.

The phenol of reaction (I) above can be obtained commercially or it can be prepared by the well-known reaction of a m-hydroxyphenyl methyl ketone or m-hydroxyphenyl ethyl ketone with an appropriate Grignard reagent. The Grignard reagent may be ethyl magnesium bromide, propyl magnesium bromide, vinyl magnesium bromide, etc. The reaction is generally run at a temperature of from 0° C. to 10° C. Generally, magnesium turnings will be mechanically stirred with the appropriate hydrocarbyl bromide to form the Grignard reagent; then the ketone added. The product can be recovered by the addition of water and extracted with ether.

If desired, the m-hydroxyphenyl methyl or ethyl ketone can be prepared by the well known reaction of acid halide with phenol in the presence of aluminum trichloride, etc.

The present invention may be more fully understood by reference to the following examples:

Example 1(a) — Preparation of m-(2-hydroxy-2-butyl)phenol

Ethyl magnesium bromide was prepared by reacting 25.2 g. ethyl bromide in 150 ml. of ether with a suspension of 6.0 g. of magnesium in 75 ml. of ether in the usual manner. After cooling to 0° to 10° C. 13.6 g. of m-hydroxyacetophenone in 300 ml. of ether were added dropwise over approximately 1 hour's time. Stirring was continued for approximately one-half hour, then 40 ml. of a saturated ammonium chloride solution was added dropwise. The ether phase was decanted, dried with magnesium sulfate overnight, filtered and stripped leaving 14.2 g. of a yellow solid, melting point 79°–82° C.

Example 1(b) — Preparation of m-(2-hydroxy-2-butyl)phenyl N-methyl carbamate 8.3 g. crude product of Example 1(a) was mixed with 2.8 g. methyl isocyanate in 25 ml. of dimethoxyethane with six drops of triethylamine. The reaction mixture was stirred overnight. Some initial warming occurred. The reaction mixture was stripped, yielding 11.1 g. of a brown oil which crystallized on scratching, melting point 85°–90° C. Element analysis: nitrogen - calculated 6.28 percent; found 6.17 percent.

Example 2(a) — Preparation of m-(2-hydroxy-2-pentenyl-4)phenyl 2-pyranyl ether

Eight g. allyl chloride freshly distilled in 50 ml. of tetrahydrofuran was added with rapid stirring to 2.5 g magnesium in 100 ml. of tetrahydrofuran. The reaction was initiated with a small crystal of iodine. 7 g. m-acetophenyl 2-pyranyl ether in 25 ml. of tetrahydrofuran was added dropwise and the resulting mixture stirred overnight. The reaction was stopped by the addition of 500 ml. water and the product removed by ether extraction. The extracts were washed with water, dried over magnesium sulfate and stripped to give 7.5 g. of the product.

Example 2(b) — Preparation of m-(2-hydroxy-2-pentenyl-4)phenol 7.75 g. of the product of Example 2(a) was mixed with 150 ml. of ether and added to dilute $H_2SO_4$ (5 ml. of concentrated $H_2SO_4$ plus 200 ml. of ice water) and the cold mixture stirred and slowly allowed to warm to room temperature. The ether layer was then separated and extracted twice with 100 ml. of 10 percent sodium hydroxide solution. The combined extracts were acidified with concentrated HCl and extracted three times with 100 ml. of ether. These combined extracts were then mixed with water, dried over magnesium sulfate and stripped to give 3.5 g. of the phenol.

Example 2(c) — Preparation of m-(2-hydroxy-2-pentenyl-4)phenyl N-methyl carbamate 3.5 g. of the phenol of Example 2(b) was dissolved in 100 ml. of dimethoxyethane and 10 ml. of methyl isocyanate was added. Then two to three drops of triethylamine were added and the mixture began to reflux. When the heat of reaction had subsided, the mixture was refluxed for a total of 3 hours. After stripping off the solvent the residue was recrystallized from ethanol-water to give 3.2 g. of the desired carbamate. Analysis showed nitrogen 5.95 calculated; 5.61 found.

Other carbamates of the present invention were prepared in accordance with the above examples and are reported in Table I.

TABLE I

| Compound | Elemental Analysis % Nitrogen | |
|---|---|---|
| | Calculated | Found |
| m-(3-hydroxy-3-pentyl)phenyl N-methyl carbamate | 5.91 | 5.29 |
| m-(2-hydroxy-2-pentyl)phenyl N-methyl carbamate | 5.91 | 6.14 |
| m-(2-hydroxy-2-butenyl-3)phenyl N-methyl carbamate | 6.33 | 6.95 |

In addition to the specific formulations and application techniques described below, one or more of the carbamates of the present invention may be applied in other liquid or solid formulation to the insects, their environment, or hosts susceptible to insect attack. For example, they may be sprayed or otherwise applied directly to plants or soil so as to effect control of insects coming into contact therewith.

Formulations of the compounds of this invention will comprise a toxic amount of one or more carbamates and a biologically inert carrier. Usually they will also contain a wetting agent. Solid carriers such as clay, talc, sawdust and the like may be used in such formulations. Liquid diluents which may be used with these compounds include water and aromatic solvents. In addition these formulations may contain other compatible pesticides, fillers, stabilizers, attractants and the like.

The concentration of the active ingredient to be used with inert carriers, either solid or liquid carriers, will be dependent upon many factors, such as the particular carbamate compound which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.0001 percent by weight to as high as 50 percent by weight or higher. Economically, of course, it is desirable to use lower concentrations of this active ingredient. Thus, it is usually desirable to use less than 20 percent by weight of the active ingredient in a particular composition.

The terms "insecticide" and "insect" as used herein refer to their broad and commonly understood usage rather than to those creatures which in the strict biological sense are classified as insects. Thus, the term "insect" is used not only to include small invertebrate animals belonging to the class Insecta but also to other relates classes of arthropods whose members are segmented invertebrates having more or fewer than six legs, such as spiders, mites, ticks, centipedes, worms and the like.

The following tests were conducted with representative compounds of the present invention to show their insecticidal activity. Test results are reported in Table II.

Test Procedures

American Cockroach (*Periplaneta americana L.*) — Microspray Method: A 500 ppm acetone solution of the candidate toxicant was placed in a microsprayer (atomizer). A random mixture of anesthetized male and female roaches was placed in a container and 55 mg. of the above-described acetone solution was sprayed on them. A lid was placed on the container. A mortality reading was made after 24 hours.

American Cockroach (*Periplaneta americana L.*) — Microdrop Method: A 650 ppm acetone solution of the candidate toxicant was placed in a micrometer assembly. A random mixture of anesthetized male and female roaches was placed on a tray and 2.5 microliters of the above-described acetone solution was applied directly to the abdomen of each roach. The treated roaches were held in recovery cages and the temperature maintained at 72°–75° F. A mortality reading was made after 24 hours.

Milkweed Bug (*Oncopeltus fasciatus*): A 650 ppm acetone solution of the candidate toxicant was placed in a micrometer assembly. A random mixture of anesthetized male and female milkweed bugs was placed on a tray and 2.5 microliters of the above-described acetone solution was applied directly to the abdomen of each insect. The treated insects were held in recovery cages and the temperature maintained at 72°–75° F. A mortality reading was made after 24 hours.

Dock Beetle (*Gastroidea cyanea melsl.*): A 10 ppm toxic solution was prepared by mixing 50 mg. toxicant to 5 ml. acetone (or multiples thereof) and diluting with water. Dock weed (Rumex) leaves were dipped and held immersed for about 3 seconds in the toxicant solution. The leaves were then dried and placed in contact with dock beetle larvae. The larvae and leaves were held in an incubator at 70°–75° F. for 24 hours, after which mortality determinations were made.

TABLE II

| Compound | Cockroach (Microspray Method) | Cockroach (Microdrop Method) | Milkweed Bug | Dock Beetle |
|---|---|---|---|---|
| m-(2-hydroxy-2-butenyl-3)phenyl N-methyl carbamate | 100 | | | |
| m-(2-hydroxy-2-pentenyl-4)phenyl N-methyl carbamate | 100 | | | |
| m-(3-hydroxy-3-butyl)phenyl N-methyl carbamate | | 100 | 96 | 100[1] |
| m-(2-hydroxy-2-butyl)phenyl N-methyl carbamate | | 100 | 100 | 100 |
| m-(2-hydroxy-2-pentyl)phenyl N-methyl carbamate | | 93 | 100 | 100 |

[1] 7.8 ppm

As will evident to those skilled in the art, various modifications on this invention can be made or followed, in the light of the foregoing disclosure and discussion, without departing from the spirit or scope of the disclosure or from the scope of the following claims.

I claim:

1. Compound of the formula

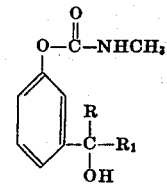

wherein R is methyl or ethyl and $R_1$ is ethyl, propyl, vinyl or allyl.

2. Compound of claim 1 wherein R is methyl and $R_1$ is ethyl, n-propyl, vinyl or allyl.

3. Compound of claim 1 wherein R is methyl and $R_1$ is n-propyl.

4. Compound of claim 1 wherein R is methyl and $R_1$ is ethyl.